United States Patent
Choi

(10) Patent No.: US 8,385,166 B2
(45) Date of Patent: Feb. 26, 2013

(54) REPEATABLE RUN OUT COMPENSATION

(75) Inventor: Soo Young Choi, Suwon-si (KR)

(73) Assignee: Seagate Technology International, LLC, Grand Cayman (KY)

( * ) Notice: Subject to any disclaimer, the term of this patent is extended or adjusted under 35 U.S.C. 154(b) by 1025 days.

(21) Appl. No.: 12/017,657

(22) Filed: Jan. 22, 2008

(65) Prior Publication Data

US 2008/0175113 A1    Jul. 24, 2008

(30) Foreign Application Priority Data

Jan. 24, 2007 (KR) .................. 10-2007-0007605

(51) Int. Cl.
    *G11B 5/09* (2006.01)
(52) U.S. Cl. ................... 369/47.14; 360/77.04
(58) Field of Classification Search ............... 369/47.14, 369/47.1, 47.15; 360/77.04; 386/113, 125
    See application file for complete search history.

(56) References Cited

U.S. PATENT DOCUMENTS

| | | | |
|---|---|---|---|
| 6,765,747 B1 | 7/2004 | Sun et al. | |
| 6,819,521 B2 | 11/2004 | Ho et al. | |
| 6,937,420 B1 | 8/2005 | McNab et al. | |
| 7,330,332 B2 * | 2/2008 | Baek et al. ................. | 360/77.04 |

FOREIGN PATENT DOCUMENTS

KR      2002-1742      1/2002

\* cited by examiner

*Primary Examiner* — Ali Neyzari

(57) ABSTRACT

A method to compensate repeatable run out of a hard disk drive apparatus includes receiving a write or read command to write or read data with respect to a disk having an inner diameter (ID) area, a middle diameter (MD) area, and an outer diameter (OD) area which are preset, determining a present position of a magnetic head and a position where the magnetic head writes or read data, stopping an operation of at least one of RRO compensators for RRO components of particular frequencies when the present position of the magnetic head is the ID area and the position where the magnetic head writes or reads the data is the MD area or OD area of the disk, and performing data writing or reading by performing seeking and settling of the magnetic head.

17 Claims, 4 Drawing Sheets

REPEATABLE RUN OUT COMPENSATION

CROSS-REFERENCE TO RELATED APPLICATIONS

This application claims the priority of Korean Patent Application No. 10-2007-0007605, filed on 24 Jan. 2007, in the Korean Intellectual Property Office, the disclosure of which is incorporated herein in its entirety by reference.

BACKGROUND OF THE INVENTION

1. Field of the Invention

The present general inventive concept relates to a hard disk drive apparatus, a method to compensate repeatable run out of a hard disk drive apparatus, and a computer-readable recording media recording the method, and more particularly, to a hard disk drive apparatus which can adaptively operate an RRO compensator according to a seeking path of a magnetic head and accordingly improve the servo control and track mis-registration (TMR) performances, a method to compensate RRO of a hard disk drive apparatus, and a computer-readable recording media recording the method.

2. Description of the Related Art

Hard disk drive apparatuses (HDDs) are one of memory devices formed of electronic parts and mechanical parts and recording and reproducing data by converting digital electric pulses to a magnetic field that is more permanent. The HDDs are widely used as auxiliary memory devices of computer systems because of fast access time for a large amount of data.

With the recent development in the technology related to the head, the storage density of an HDD has been sharply increased. Accordingly, it becomes more important to maintain a track mis-registration (TMR) performance over an appropriate level without losing stability in recording and reproducing performance of the head.

Repeatable run out (RRO) and non-repeatable run out (NRRO) are factors that affect the TMR performance. Among them, RRO is mainly generated due to the eccentricity of tracks with respect to the center of a disk or the deformation of a disk. RRO works as a disturbance in servo control to deteriorate the servo control performance of a head. RRO can be divided into RRO components having various frequencies such as 1x, 2x, 3x, . . . , Nx. Here, the unit "x" signifies a frequency corresponding to the rotational speed of a disk.

Of the RRO components, the 1x, 2x, and 3x RRO components are generated mainly due to the eccentricity of tracks with respect to the disk center and exist throughout the overall area of the disk. The RRO components over 4x are generated mainly due to the disk deformation and tend to greatly decrease from the inner diameter (ID) area of a disk to the outer diameter (OD) area.

To compensate RRO, an RRO compensator and a RRO correction code (RCC) are used. In general, the RRO components under a predetermined frequency are compensated using the RRO compensator while the RRO components over the predetermined frequency are compensated using the RRO correction code. For example, 1x through 6x RRO components are compensated using the RRO compensator and 7x or higher RRO components are compensated using the RRO correction code. The RRO compensators are provided in parallel in a number corresponding to the number of RRO components to be compensated.

However, when the conventional RRO compensator is used, a plurality of RRO compensators provided corresponding to the RRO components under a predetermined frequency are all turned on regardless of a seeking path of a magnetic head. Accordingly, the 4x or higher RRO components that are greatly decreased in the OD area of the disk are compensated by the RRO compensator without discrimination. As a result, when the magnetic head located in the ID area is set to seek data in a middle diameter (MD) area or the OD area and data recording or reproducing is performed, over-compensation is made to the 4x or higher RRO components by the RRO compensator. Thus, seek time increases and a position error signal (PES) increases.

SUMMARY OF THE INVENTION

The present general inventive concept provides a hard disk drive apparatus which can adaptively operate an RRO compensator according to a seeking path of a magnetic head so as to improve servo control and TMR performances of a hard disk drive apparatus, a method to compensate repeatable run out (RRO) of a hard disk drive apparatus, and a computer-readable recording media recording the method.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a method to compensate RRO of a hard disk drive apparatus includes receiving a write or read command to respectively write or read data with respect to a disk having an inner diameter (ID) area, a middle diameter (MD) area, and an outer diameter (OD) area which are preset, determining a present position of a magnetic head and a position where the magnetic head writes or reads data, stopping an operation of at least one of the RRO compensators for RRO components of particular frequencies when the present position of the magnetic head is the ID area and the position where the magnetic head writes or reads the data is the MD area or OD area of the disk, and performing data writing or reading by performing seeking and settling of the magnetic head.

In the stopping of the operation of at least one of the RRO compensators for RRO components of particular frequencies, the RRO components of the particular frequencies may be RRO components of 4x or higher frequencies, where "x" represents a frequency corresponding to a rotational speed of the disk.

The 4x or higher frequencies may be 4x, 5x, and 6x frequencies.

The method further comprises operating the RRO compensators for the RRO components of the particular frequencies again after the data writing or reading is complete.

The ID area may be located at an innermost area of the disk when cylinders where user data is written are divided into three areas according to a distance from a center of the disk, the OD area may be located at an outermost area of the disk, and the MD area may be located between the ID area and the OD area, and each of the ID area, the MD area, and the OD area may have substantially a same number of the cylinders.

The foregoing and/or other aspects and utilities of the present general inventive concept may also be achieved by providing a computer-readable recording medium having embodied thereon a computer program to execute a method, wherein the method includes receiving a write or read command to respectively write or read data with respect to a disk having an inner diameter (ID) area, a middle diameter (MD) area, and an outer diameter (OD) area which are preset, determining a present position of a magnetic head and a position where the magnetic head writes or reads data, stopping an operation of at least one of the RRO compensators for RRO components of particular frequencies when the present position of the magnetic head is the ID area and the position where the magnetic head writes or reads the data is the MD area or OD area of the disk, and performing data writing or reading by performing seeking and settling of the magnetic head.

The foregoing and/or other aspects and utilities of the present general inventive concept may also be achieved by providing a hard disk drive apparatus including a disk having an inner diameter (ID) area, a middle diameter (MD) area, and an outer diameter (OD) area which are preset, a magnetic head to write or read data on the disk, and a controller to receive a data write or read command, to determine a present position of the magnetic head and a position where the magnetic head writes or reads the data, to stop an operation of RRO compensators for RRO components of particular frequencies when the present position of the magnetic head is the ID area of the disk and the position where the magnetic head writes or reads the data is the MD area or the OD area of the disk, and to perform the data writing or reading by allowing the magnetic head to seek and settle.

The RRO components of the particular frequencies may be RRO components of 4x or higher frequencies.

The 4x or higher frequencies may be 4x, 5x, and 6x frequencies.

The controller may operate the RRO compensators for the RRO components of the particular frequencies again after the data writing or reading is complete.

The ID area may be located at an innermost area of the disk when cylinders where user data is written are divided into three areas according to a distance from a center of the disk, the OD area may be located at an outermost area of the disk, and the MD area may be located between the ID area and the OD area, and each of the ID area, the MD area, and the OD area may have substantially a same number of the cylinders.

The foregoing and/or other aspects and utilities of the general inventive concept may also be achieved by providing a repeatable run out (RRO) compensator unit usable with a disk drive apparatus including a disk having an inner diameter area and an outer diameter area including a plurality of RRO compensators to compensate a plurality of RRO components, respectively and a controller to control the plurality of RRO compensators by placing or maintaining at least one of the plurality of RRO compensators in a non-compensating mode when a position of the head is proximate to the inner diameter area of the disk and is set to seek data in the outer diameter area of the disk.

The foregoing and/or other aspects and utilities of the general inventive concept may also be achieved by providing disk drive apparatus including at least one disk having an inner diameter area and an outer diameter area, a head to at least one of read or write data on the at least one disk and a repeatable run out (RRO) compensator unit including a plurality of RRO compensators to compensate a plurality of RRO components, respectively and a controller to control the plurality of RRO compensators by placing or maintaining at least one of the plurality of RRO compensators in a non-compensating mode when a position of the head is proximate to the inner diameter area of the disk and is set to seek data in the outer diameter area of the disk.

The foregoing and/or other aspects and utilities of the general inventive concept may also be achieved by providing method of compensating for one or more repeatable run out (RRO) components in a disk drive apparatus, the method including determining a position of a head relative to an inner diameter and an outer diameter of a disk, compensating for one or more RRO components by one or more RRO compensators, placing or maintaining at least one of the one or more RRO compensators in a non-compensating mode when the determination that the position of the head is proximate to the inner diameter area of the disk and is set to seek data in the outer diameter area of the disk.

BRIEF DESCRIPTION OF THE DRAWINGS

The above and/or other aspects and advantages of the present general inventive concept will become apparent and more readily appreciated from the following detailed description, taken in conjunction with the accompanying drawings of which.

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
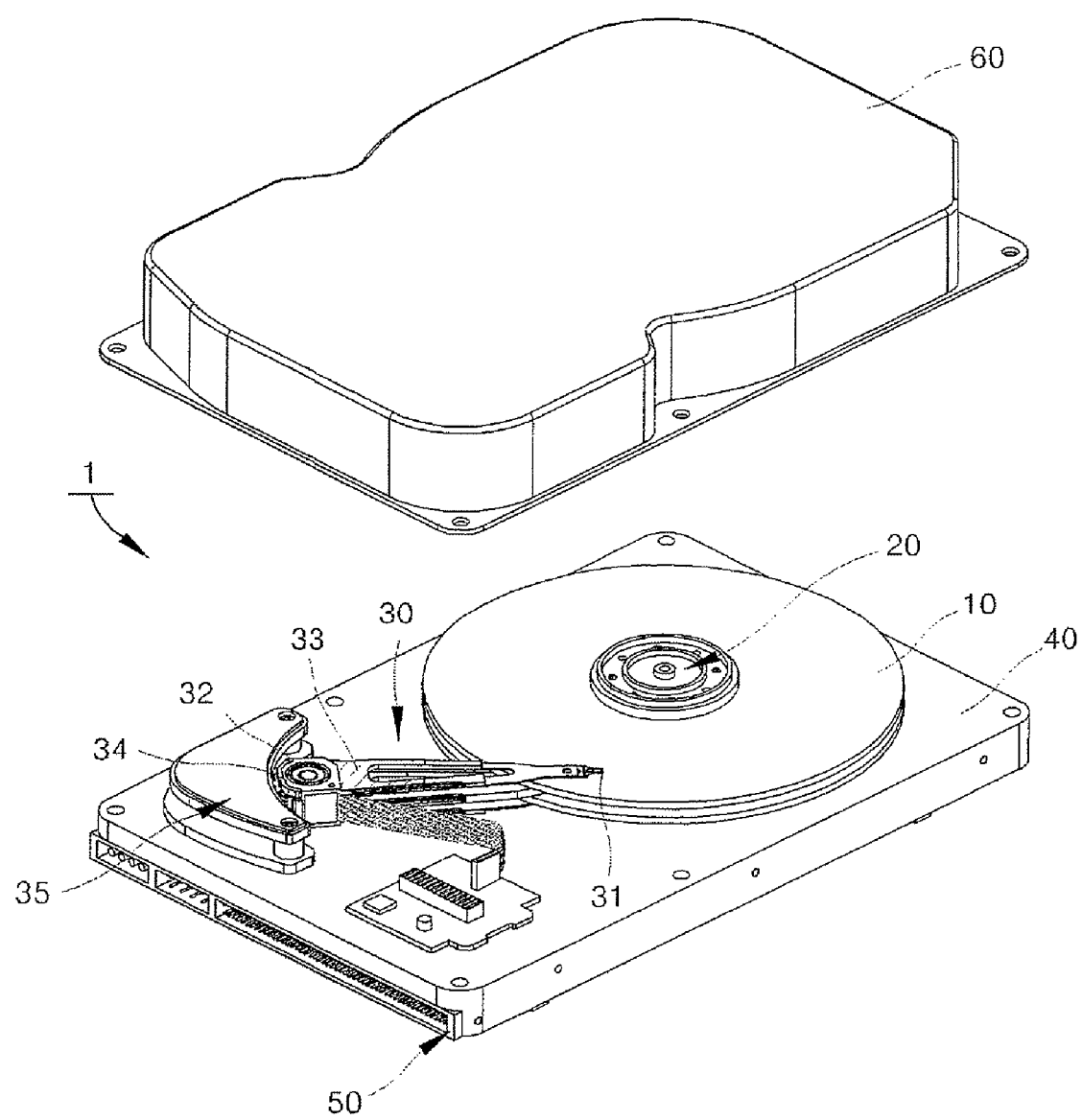
FIG. 1 is a partially exploded perspective view illustrating a hard disk drive apparatus according to an embodiment of the present general inventive concept.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
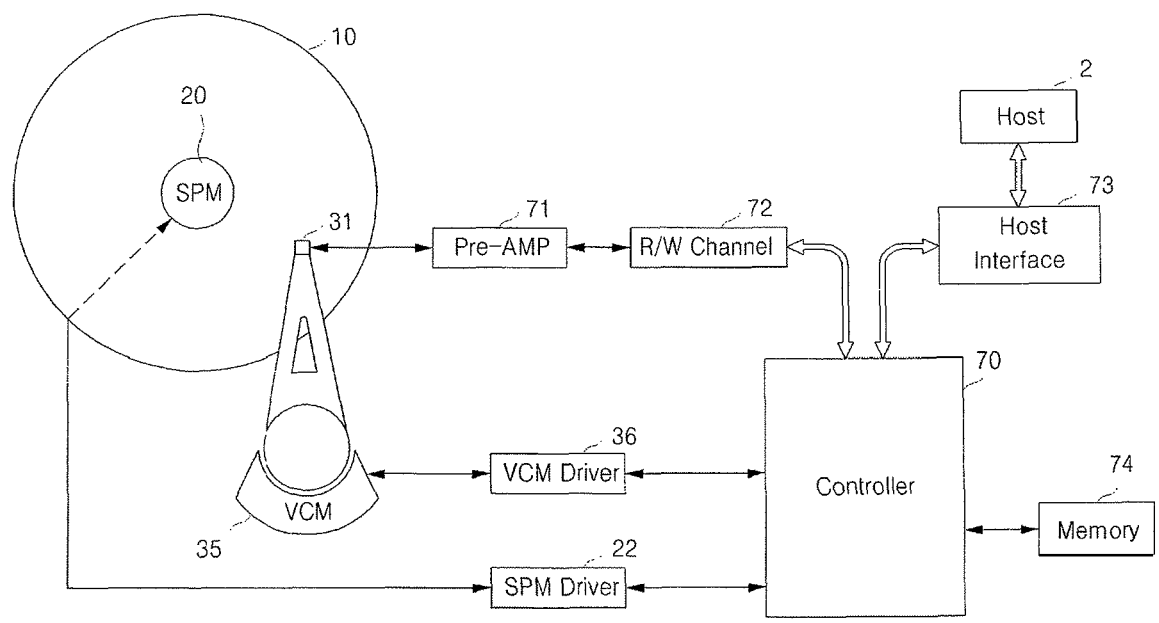
FIG. 2 is a block diagram of a drive circuit illustrating the hard disk drive apparatus of FIG. 1.
Figure 3:
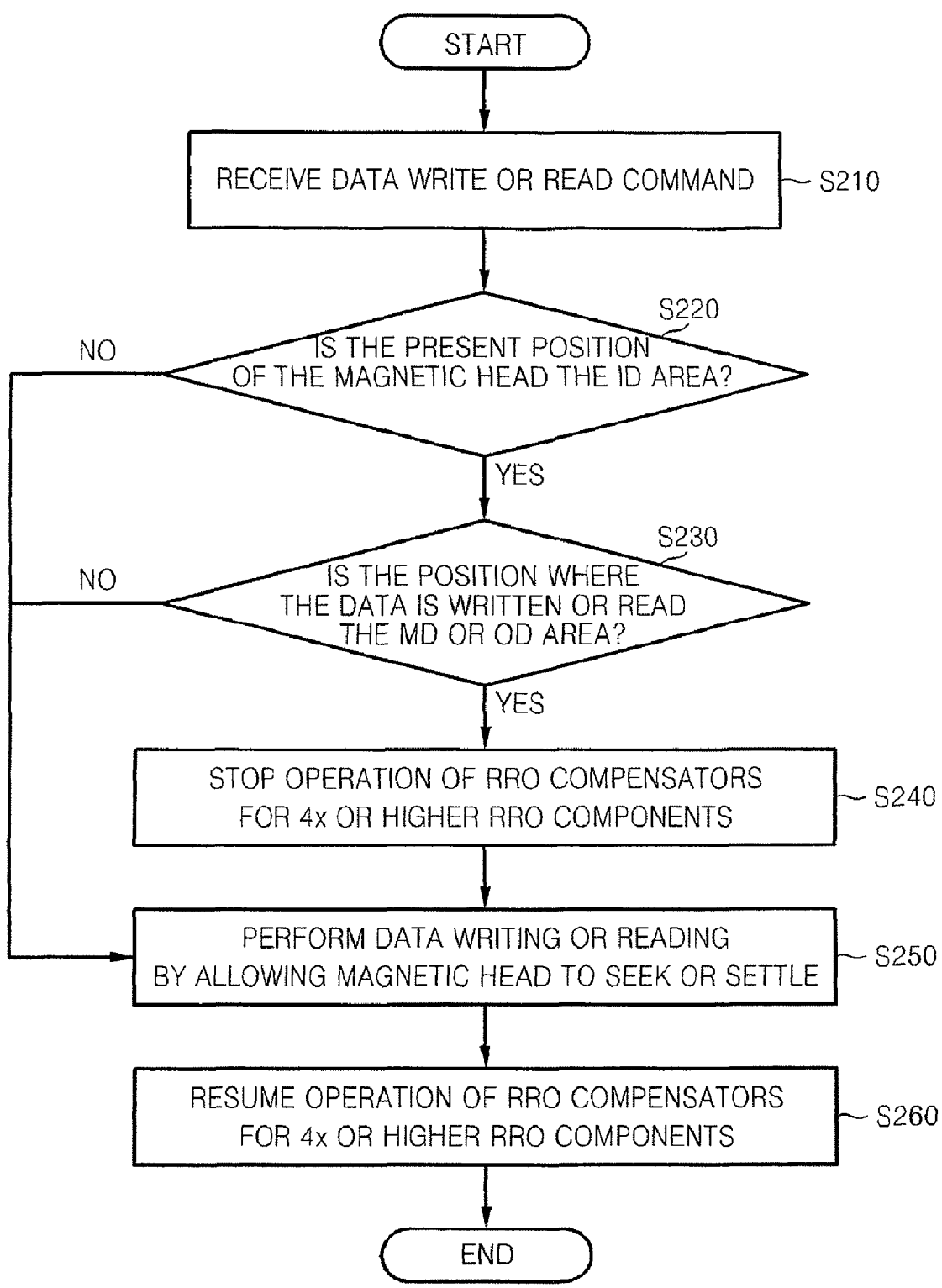
FIG. 3 is a flowchart illustrating a method to compensate RRO of the hard disk drive apparatus FIG. 1.
Figure 4:
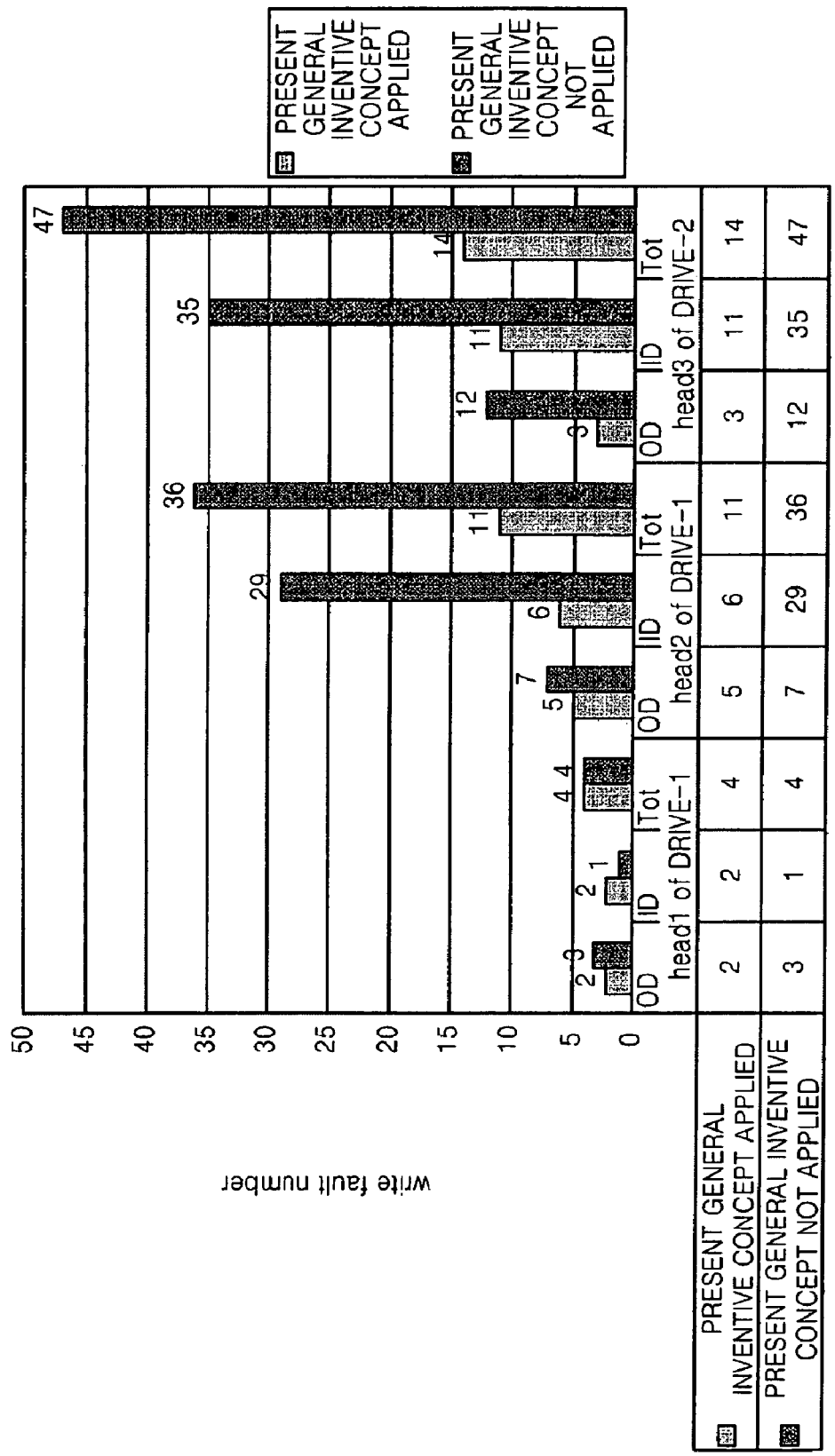
FIG. 4 is a graph illustrating a result of a comparison between adopting a method to compensate RRO of a hard disk drive apparatus according to an embodiment of the present general inventive concept and not adopting the method.

FIG. 1 is a partially exploded perspective view illustrating a hard disk drive apparatus according to an embodiment of the present general inventive concept. FIG. 2 is a block diagram illustrating a drive circuit of the hard disk drive apparatus of FIG. 1. FIG. 3 is a flowchart illustrating a method to compensate repeatable run out (RRO) of the hard disk drive apparatus of FIG. 1. FIG. 4 is a graph illustrating a result of a comparison between adopting the method to compensate RRO of a hard disk drive apparatus according to the present general inventive concept and not adopting the method.

Referring to FIG. 1, a hard disk drive apparatus (HDD) 1 according to an embodiment of the present general inventive concept includes a disk 10 to record and store data, a spindle motor 20 to support and rotate the disk 10, a head stack assembly (HSA) 30 to read data on the disk 10, a base 40 on which constituent units are assembled, a printed circuit board assembly (PCBA) 50 coupled to the lower portion of the base 40 and having circuit units on a printed circuit board (PCB) to control various units, and a cover 60 to cover the upper portion of the base 40.

The disk 10 is a media to record and store data and provided in a plural number. The disk 10 is divided into an inner diameter (ID) area, a middle diameter (MD) area, and an outer diameter (OD) area in the order of being close to a center of the disk 10. These areas include a plurality of circular tracks that are concentric with the center of the disk 10. The spindle motor 20 receives a control signal of a controller 70 and rotates the disk 10. The rotational angular speed of the spindle motor 20 may be 3,600 rpm, 5,400 rpm, 7,200 rpm, or 10,000 rpm.

The centers of tracks of the disk 10 may accurately match the center of the spindle motor 20. However, it is common that the centers of tracks of the disk 10 are eccentric to the center of the spindle motor 20 due to disturbance during a servo track write process or an error during the assembly process of the disk 10 and the spindle motor 20. The eccentricity causes the generation of a 1x repeatable run out (RRO) component of RRO components. Also, 2x and 3x RRO components are generated.

Although the disk 10 is designed as a circular disc, the disk 10 can be deformed. The deformation can generate 4x or higher RRO components of the RRO components. The RRO components disturb the positioning of a magnetic head 31 at the center of a track to record or reproduce data. That is, the RRO components deteriorate or increase a position error signal (PES) that indicates a degree of the magnetic head 31 locating out of the center of a target track. Thus, there is a need to control the position of the magnetic head 31 by compensating the RRO components. Accordingly, the present embodiment provides an RRO compensator that will be described later.

The HSA 30, which is a carriage to record or reproduce data with respect to the disk 10, includes the magnetic head 31 recording data on the disk 10 or reproducing recorded data, an actuator arm 33 to pivot across the disk 10 around a pivot shaft 32 so that the magnetic head 31 can access data on the disk 10, a pivot shaft holder 34 to support the pivot shaft 32 capable of rotating, to which the actuator arm 33 is coupled and supported, and a voice coil motor (VCM) 35 provided at the opposite side of the actuator arm 33 with respect to the pivot shaft holder 34 to rotate the actuator arm 33.

The magnetic head 31 reads data from the disk 10 by detecting a magnetic field formed on the surface of the disk 10 or records data on the disk 10 by magnetizing the surface of the disk 10. The actuator arm 33 has an end connected to the magnetic head 31 and the other end rotatably coupled to the pivot shaft 32. The actuator arm 33 is extended long so that the magnetic head 31 can move over the surface of the disk 10.

The pivot shaft holder 34 supports the pivot shaft 32 capable of rotating and simultaneously supports the actuator arm 33 coupled to the pivot shaft holder 34. The VCM 35 makes the actuator arm 33 rotate around the pivot shaft holder 34. The VCM 35 includes a voice coil (not illustrated) and a magnet (not illustrated). The VCM 35 makes the actuator arm 33 pivot by an electromagnetic force generated by the interaction between lines of a magnetic force generated by the magnet and current flowing in the voice coil.

Although in the present embodiment the VCM 35 is provided to rotate the actuator arm 33, a stepper motor capable of rotating the actuator arm 33 by a predetermined angle according to an input signal can be used instead. However, the VCM 35 has advantages in that it is resistant to heat, a periodic format is not needed, and reliability is superior.

Also, the hard disk drive apparatus 1 needs a drive circuit to control parts of the hard disk drive apparatus 1. The hard disk drive apparatus 1, as illustrated in FIG. 2, includes a preamplifier (pre-AMP) 71, a read/write channel (R/W channel) 72, a host interface 73, a VCM driver 36, a spindle motor driver (SPM) 22, a controller 70, and a memory 74.

Referring to FIG. 2, the pre-AMP 71 amplifies a data signal that the magnetic head 31 reads from the disk 10 or write current converted by the R/W channel 72 and provides the amplified signal to the magnetic head 31. When receiving the write current from the pre-AMP 71, the magnetic head 31 can generate a magnetic field. The magnetic head 31 magnetizes the disk 10 using the magnetic field to record data on the disk 10.

In a data read mode in which data recorded on the disk 10 is read, the R/W channel 72 converts a signal read from the disk 10 by the magnetic head 31 and amplified by the pre-AMP 71 to a digital signal and inputs the converted signal to the controller 70. In a data write mode in which data is recorded on the disk 10, the R/W channel 72 receives user input data received through the host interface 73, converts the received data to a binary data stream that is easy to record, and outputs the converted data to the pre-AMP 71.

A host device 2 may include components that generally control and operate a computer system including the hard disk drive apparatus like a CPU or an I/O controller of a computer. The host interface 73 transmits the data converted to a digital signal to the host device 2 in the date read mode and receives the user input data from the host device 2 and outputs the received data to the controller 70 in the data write mode.

The VCM driver 36 receives the control signal of the controller 70 and controls the amount of current applied to the VCM 35. The SPM driver 22 receives the control signal of the controller 70 and controls the amount of current applied to the spindle motor 20.

The controller 70 may be a digital signal processor (DSP), a micro-processor, or a micro-controller. The controller 70 in the data write mode receives the user input data from the host device 2 through the host interface 73 and outputs the received data to the R/W channel 72 and in the data read mode receives a data signal read by the magnetic head 31, amplified by the pre-AMP 71, and converted by the R/W channel 72 to a digital signal and outputs the received signal to the host interface 73. Also, the controller 70 controls the VCM 35 to move the magnetic head 31 to a desired position on the disk 10 and the spindle motor 20 to adjust the rotational speed of the disk 10.

The controller 70 includes an RRO compensator (not illustrated) that compensates RRO generated due to the eccentricity of tracks of the disk 10 or the deformation of the disk 10. As described above, RRO includes various RRO components according to frequencies. Accordingly, the RRO compensator is provided in a plural number corresponding to the RRO components to be compensated. In the present embodiment, a total of six RRO compensators are provided corresponding to 1x to 6x RRO components of the RRO components. The RRO components are arranged in parallel and operated individually. An RRO compensation method of the hard disk drive apparatus 1 which is described later can be stored in a memory 74 in a form of software or firmware and then embodied by the controller 70.

An RRO compensation method of the hard disk drive apparatus 1 according to an embodiment of the present general inventive concept is described below. Referring to FIG. 3, when the controller 70 receives a data write or read command from the host interface 73 (operation S210), the controller 70 determines whether the present position of the magnetic head 31 is the ID area of the disk 10 (operation S220). The present position of the magnetic head 31 can be determined from servo information read by the magnetic head 31.

If the present position of the magnetic head 31 is not the ID area of the disk 10, the magnetic head 31 is moved to seek a target track to write or read data and settled at the target track to perform writing or reading data (operation S250). If the present position of the magnetic head 31 is the ID area of the disk 10, it is determined that the position of the target track to write or read data is the MD or OD area of the disk 10

(operation S230). The information about the position of the target track to write or read data is given with the write or read command received from the host interface 73.

If the position of the target track to write or read data is not the MD or OD area of the disk 10, the magnetic head 31 is moved to seek the target track to write or read data and settled at the target track to perform writing or reading data (operation S250). If the position of the target track to write or read data is the MD or OD area of the disk 10, the operations of the RRO compensators for the 4x, 5x, and 6x RRO components, of the plural RRO compensators provided in the controller 70, are stopped (operation S240). Since the plural RRO compensators of the controller 70 are connected in parallel, each RRO compensator can be independently turned on or off. The operations of the RRO compensators for the 4x, 5x, and 6x RRO components are stopped when the magnetic head 31 positioned in the ID area is moved to seek the MD or OD area to write or read data. The operations of the RRO compensators for the 4x, 5x, and 6x RRO components are stopped because the 4x, 5x, and 6x RRO components of the RRO components are greatly decreased in the MD or OD area of the disk 10.

Next, the magnetic head 31 is moved to seek the target track and settled at the target track to write or read data (operation S250). Since the operations of the RRO compensators for the 4x, 5x, and 6x RRO components are already stopped in the above-described operation, the compensation for the 4x, 5x, and 6x RRO components is not performed during which the magnetic head 31 seeks the target track. Thus, since no time is spent for the compensation for the 4x, 5x, and 6x RRO components, the seek time to the target track by the magnetic head 31 is reduced. Also, since over-compensation for the 4x, 5x, and 6x RRO components is not generated, the deterioration of the PES due to the over-compensation for the 4x, 5x, and 6x RRO components after the magnetic head 31 performs seeking and settling can be prevented.

Finally, when the writing or reading data at the target track is complete, the RRO compensators for the 4x, 5x, and 6x RRO components are turned on (operation S260). In the present embodiment, the stopping of the operations of the RRO compensators for the 4x, 5x, and 6x RRO components is made only when the magnetic head 31 performs a seek operation from the ID area to the MD or OD area. Thus, the RRO compensators for the 4x, 5x, and 6x RRO components are turned on until the seek operation is performed again.

FIG. 4 is a graph illustrating a result of a comparison between adopting a method to compensate RRO of the hard disk drive apparatus 1 according to the present general inventive concept and not adopting the method. The test is carried out for a first hard disk drive apparatus (hard disk drive-1) and a second hard disk drive apparatus (hard disk drive-2) that have a same structure as that of the hard disk drive apparatus 1. In hard disk drive-1, two magnetic heads head1 and head2 are tested and, in hard disk drive-2, one magnetic head head3 is tested. Of the three magnetic heads used for the test, head1 of the magnetic heads of hard disk drive-1 has a large 4x or higher RRO in the MD and OD areas while two other magnetic heads head2 and head3 have a small 4x or higher RRO in the MD and OD areas.

Also, the test is performed by repeating an operation of the magnetic heads' seeking data from the ID area to the OD area and simultaneously writing arbitrary data to tracks existing on the seeking path, and counting the number of write faults generated in doing so. The test is performed by applying the RRO compensation method according to the present general inventive concept once and then not applying the method.

Referring to FIG. 4, the magnetic heads head1 and head2 of hard disk drive-1, the magnetic head head1 having a large 4x or higher RRO in the MD and OD areas is not substantially affected in the number of the generated write faults by the application of the above-described RRO compensation method. However, in the magnetic heads head2 and head3 having a small 4x or higher RRO in the MD and OD areas, the write fault can be reduced by applying the RRO compensation method. The reduction in the write faults by applying the RRO compensation method as described above results in PES or TMR performance being improved. Since the 4x or higher RRO greatly decreases toward the OD area of the disk 10, the PES or TMR performance of the hard disk drive apparatus can be improved by applying the above-mentioned RRO compensation method.

According to the RRO compensation method of a hard disk drive apparatus according to various embodiments of the present general inventive concept, the RRO compensators are adaptively operated according to the seeking path of the magnetic head to write or read data. That is, the operations of the RRO compensators for 4x or higher RRO components are stopped only when the magnetic head 31 performs seeking operation from the ID area of the disk 10 to other areas such as the MD or OD areas. Accordingly, since unnecessary compensation for the 4x or higher RRO components is not performed during the seeking operation, the seek time of the magnetic head 31 is reduced (improvement of the servo control performance) and the deterioration of PES due to the unnecessary RRO compensation after seeking and settling can be prevented (improvement of the TMR performance).

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various embodiments of the present general inventive concept have been illustrated and described, the present general inventive concept is not limited to the described embodiments. Instead, it would be appreciated by those skilled in the art that changes may be made to these embodiments without departing from the principles and spirit of the general inventive concept, the scope of which is defined by the claims and their equivalents.

According to the above-described embodiments of the present general inventive concept, a hard disk drive apparatus which can adaptively operate the RRO compensators according to the seeking path of the magnetic head and accordingly improve the servo control and TMR performances of the hard disk drive apparatus, a method to compensate RRO of a hard disk drive apparatus, and a computer-readable recording media recording the method are provided.

What is claimed is:

1. A method, comprising:
receiving a write or read command to respectively write or read data with respect to a disk having an inner diameter (ID) area, a middle diameter (MD) area, and an outer diameter (OD) area which are preset;
determining a present position of a magnetic head and a position where the magnetic head writes or reads data;
stopping an operation of at least one of a plurality of RRO compensators for RRO components of particular frequencies when the present position of the magnetic head is the ID area and the position where the magnetic head writes or reads the data is the MD area or OD area of the disk; and
performing data writing or reading by performing seeking and settling of the magnetic head.

2. The method of claim 1, wherein, in stopping of the operation of at least one of the RRO compensators for RRO components of particular frequencies, the RRO components of the particular frequencies are RRO components of 4x or higher frequencies, wherein "x" represents a frequency corresponding to a rotational speed of the disk.

3. The method of claim 2, wherein the 4x or higher frequencies are 4x, 5x, and 6x frequencies.

4. The method of claim 1, further comprising:
operating the RRO compensators for the RRO components of the particular frequencies again after the data writing or reading is complete.

5. The method of claim 1, wherein the ID area is located at an innermost area of the disk when cylinders where user data is written are divided into three areas according to a distance from a center of the disk, the OD area is located at an outermost area of the disk, and the MD area is located between the ID area and the OD area, and each of the ID area, the MD area, and the OD area has substantially a same number of the cylinders.

6. An apparatus, comprising:
a disk having an inner diameter (ID) area, a middle diameter (MD) area, and an outer diameter (OD) area which are preset;
a magnetic head to write or read data on the disk; and
a controller to receive a data write or read command, to determine a present position of the magnetic head and a position where the magnetic head writes or reads the data, to stop an operation of RRO compensators for RRO components of particular frequencies when the present position of the magnetic head is the ID area of the disk and the position where the magnetic head writes or reads the data is the MD area or the OD area of the disk, and to perform the data writing or reading by allowing the magnetic head to seek and settle.

7. The apparatus of claim 6, wherein the RRO components of the particular frequencies are RRO components of 4x or higher frequencies.

8. The apparatus of claim 7, wherein the 4x or higher frequencies are 4x, 5x, and 6x frequencies.

9. The apparatus of claim 6, wherein the controller operates the RRO compensators for the RRO components of the particular frequencies again after the data writing or reading is complete.

10. The apparatus of claim 6, wherein the ID area is located at an innermost area of the disk when cylinders where user data is written are divided into three areas according to a distance from a center of the disk, the OD area is located at an outermost area of the disk, and the MD area is located between the ID area and the OD area, and each of the ID area, the MD area, and the OD area has substantially a same number of the cylinders.

11. A unit, comprising:
a plurality of repeatable run out (RRO) compensators to compensate a plurality of RRO components, respectively; and
a controller to control the plurality of RRO compensators by placing or maintaining at least one of the plurality of RRO compensators in a non-compensating mode when a position of a head to read or write data is proximate to an inner diameter area of a disk of a disk drive apparatus and is set to seek data in an outer diameter area of the disk.

12. An apparatus, comprising:
at least one disk having an inner diameter area and an outer diameter area;
a head to at least one of read or write data on the at least one disk; and
a repeatable run out (RRO) compensator unit comprising:
a plurality of RRO compensators to compensate a plurality of RRO components, respectively; and
a controller to control the plurality of RRO compensators by placing or maintaining at least one of the plurality of RRO compensators in a non-compensating mode when a position of the head is proximate to the inner diameter area of the disk and is set to seek data in the outer diameter area of the disk.

13. A method, comprising:
determining a position of a head relative to an inner diameter and an outer diameter of a disk;
compensating for one or more RRO components by one or more RRO compensators;
placing or maintaining at least one of the one or more RRO compensators in a non-compensating mode when the determination that the position of the head is proximate to the inner diameter area of the disk and is set to seek data in the outer diameter area of the disk.

14. The method of claim 13, wherein the one or more RRO components comprise:
a plurality of RRO components each corresponding to an integer multiple of a frequency of a rotational speed of the disk.

15. The method of claim 14, wherein the one or more RRO compensators comprise:
a plurality of RRO compensators corresponding to the plurality of RRO components.

16. The method of claim 15, wherein the placing or maintaining operation further comprises:
placing or maintaining the plurality of RRO compensators corresponding to the integer multiple of the frequency of the rotational speed of the disk below a predetermined frequency in a compensating mode; and
placing or maintaining the plurality of RRO compensators corresponding to the integer multiple of the frequency of the rotational speed of the disk above a predetermined frequency in a non-compensating mode, when the determination that the position of the head is proximate to the inner diameter area of the disk and is set to seek data in the outer diameter area of the disk.

17. The method of claim 16, wherein the predetermined frequency is four times the frequency of the rotational speed of the disk.

* * * * *